United States Patent [19]

Sakamoto et al.

[11] Patent Number: 4,612,296

[45] Date of Patent: Sep. 16, 1986

[54] HIGH TOUGHNESS SILICON NITRIDE SINTERED BODY AND PROCESS FOR PRODUCING THE SAME

[75] Inventors: Hiroshi Sakamoto; Tadahiko Miyoshi, both of Hitachi, Japan

[73] Assignee: Hitachi, Ltd., Tokyo, Japan

[21] Appl. No.: 767,339

[22] Filed: Aug. 21, 1985

[30] Foreign Application Priority Data

Aug. 22, 1984 [JP] Japan ................................. 59-173289

[51] Int. Cl.$^4$ .............................................. C04B 35/02
[52] U.S. Cl. ....................................... 501/93; 501/87; 501/97; 264/56; 264/60; 264/125; 264/332; 156/DIG. 64; 156/DIG. 99
[58] Field of Search ............... 501/93, 87, 97; 264/56, 264/60, 125, 332; 156/DIG. 64, DIG. 99

[56] References Cited

U.S. PATENT DOCUMENTS 4,440,707 4/1984 Shimamori et al. ................... 501/97
4,521,525 6/1985 Hsieh ..................................... 501/97

Primary Examiner—Stephen J. Lechert, Jr.
Attorney, Agent, or Firm—Antonelli, Terry & Wands

[57] ABSTRACT

A high toughness silicon nitride sintered body comprises silicon nitride as a main component and at least one member selected from the group consisting of silicides and carbides in the form of plate particles, of Ti, Zr, Hf, V, Nb, Ta, Cr, Mo and W. In the sintered body, the longer diameter $d_1$ of principal plane of plate of the plate particles and the shorter diameter $d_2$ of the same plane has a relation of $d_1/d_2 < 10$, and the thickness of plate of the plate particles is 1/5 or below of $d_2$.

4 Claims, 4 Drawing Figures

10μm

HIGH TOUGHNESS SILICON NITRIDE SINTERED BODY AND PROCESS FOR PRODUCING THE SAME

BACKGROUND OF THE INVENTION

1. Field of the Invention

This invention relates to a high toughness silicon nitride sintered body suited for use in gas turbine blades, engine parts, etc. as well as to a process for producing the sintered body.

2. Description of the Prior Art

Heat-resistant alloys have heretofore been used in parts such as gas turbine blades and the like, exposed to high temperatures or other unfavorable environments. Recently, the use of such parts at high temperatures is in request for higher performances and accordingly the conditions under which heat-resistant alloys are used are approaching the use limit of such alloys. Hence, as a material replacing the heat-resistant alloys, a silicon nitrile sintered body excellent in heat resistance, oxidation resistance and thermal shock resistance has come to be paid attention.

However, because ceramics such as silicon nitrile and the like have, as well known, a large drawback of being brittle, they have not yet been put into practical application.

As a toughness-improved ceramic material, there are well known cermets disclosed in, for example, "CERAMIC BULLETIN", Vol. 60, No. 11 (1981), which are produced by subjecting a ceramic powder and a metal powder to pressure molding and then to sintering to obtain a heat-resistant material. In these cermets, since the brittleness of ceramics is compensated by the presence of a metal phase, the higher strength and toughness at the normal temperature are obtained than that of ceramics only; however, owing to the presence of a metal phase, the upper limit of the heat resistance is low and accordingly the strength and hardness of the cermets are small at high temperatures. Therefore, although the cermets have a slightly improved toughness, the toughness has not yet reached a level enough for the cermets to be used as a high temperature structural material. Further, as seen in "JOURNAL OF MATERIALS SCIENCE", 7 (1972) 663–675, there is proposed the addition of a needle-like substance such as whiskers, fibers or the like to ceramics. It is known that, according to this proposal, even if cracks appear in ceramics, the direction of the cracks are turned owing to whiskers or the like dispersed in the ceramics and consequently the ceramics have an improved toughness. However, uniform dispersion of the needle-like substance in ceramics is very difficult. When the needle-like substance is, for example, whiskers or fibers, these whiskers or fibers get intertwined in the ceramics and tend to exist in the form of lumps which has prevented the development of tough ceramics, such as a silicon nitride sintered body having a strikingly improved toughness.

Ceramics obtained by adding to silicon carbide or nitride a boride, a carbide, a nitride, a silicide or the like of various metals exhibited, only in some cases, a slightly improved toughness. An attempt of adding a powder of a metal such as W, Mo or the like to silicon nitride, molding the resulting mixture and subjecting the resulting molding to high temperature sintering to convert the added metal component to a nitride did not provide a sintered body of high toughness which can be used practically.

Ceramics obtained by adding fine particles of a silicide or a carbide to silicon nitride, $Si_3N_4$ is known. The present inventors have tried to improve the toughness of such ceramics.

SUMMARY OF THE INVENTION

The object of this invention is to provide a silicon nitride sintered body composed mainly of silicon nitride, having a strikingly improved toughness.

The present inventors have found that the toughness of $Si_3N_4$ can be improved by properly selecting the form of particles of an additive to be added to and dispersed in $Si_3N_4$. The present invention is characterized in that an additive is dispersed in $Si_3N_4$ in the form of plate particles of which the longer diameter $d_1$ and shorter diameter $d_2$ of principal plane have a relation of $d_1/d_2 < 10$ and the thickness is 1/5 or below of $d_2$. In the silicon nitride sintered body of the present invention, there may be present, together with the plate particles, particles of all other forms except whisker and fiber forms, such as disc-like and spherical particles. In other words, even when particles to be added to $Si_3N_4$ are in a disc or spherical form as well as a plate form, the resulting sintered body has an improved toughness as long as the particles of a plate form is dispersed in the sintered body in a proper proportion.

DETAILED DESCRIPTION OF THE PREFERRED EMBODIMENTS

Figure 1:
FIG. 1 is a photomicrograph showing the structure of plate particles in the silicon nitride sintered body of the present invention.

The plate particles used in the present sintered body are produced by subjecting a material to arc melting and then to mechanical grinding. In general, metals such as Fe, Ni and Co, being ductile, cannot be used for the production of plate particles. In contrast, metal silicides and metal carbides can be safely used as a material for the plate particles, because they can be ground to powders, and they can provide plate particles having conditions necessary for toughness improvement (i.e., a required plate size and a required ratio of the shorter diameter of principal plane of plate to the thickness of plate). The plate particles do not get intertwined and therefore they can be easily and uniformly mixed with a silicon nitride powder which is a matrix.

It is desirable that the ratio of the shorter diameter of principal plane of plate particles to the thickness of these particles be 5 or above. If this ratio is too small, the sintered body obtained has no sufficiently improved toughness as in the case of spherical particles mentioned above. The longer diameter of principal plane of plate particles is desirably in a range larger than the diameters of other particles present in the sintered body and smaller than 125 μm, particularly in a range of 10 to 100 μm. If the longer diameter is smaller than the range, no sufficient improvement of toughness is obtained. If the longer diameter is too large, the plate particles added act as a defect and reduce the strength and toughness of the sintered body obtained.

The amount of plate particles added is preferably in a range of 2 to 13% by volume. Addition of plate particles in too small an amount or in too large an amount provides no sufficient improvement of toughness. If the addition amount is too large, the resulting sintered body has a reduced oxidation resistance at high temperatures because of rather poor oxidation resistance of added plate particles.

Additives used in the present sintered body are required to be easily made into plate particles by subjecting to melting, grinding, etc., and further to be able to retain the plate form even after sintering of $Si_3N_4$. For satisfying these two points, the additives have further requirements of having a relatively high melting point, of causing no decomposition at the time of melting and of having a very low reactivity with $Si_3N_4$ at the time of sintering. Because of these requirements, desirable additives are silicides and carbides of Ti, Zr, Hf, V, Nb, Ta, Cr, Mo and W. Of these, silicides and carbides of V, Nb and Ta as well as carbides of Mo and W are particularly desirable, because they are stable in silicon nitrilde and can easily retain their original particle form.

The sintering temperature is preferably in a range of 1,550° C. to 1,900° C., more preferably 1,700° to 1,800° C. The sintering time is preferably in a range of 30 minutes to 2 hours, more preferably 30 minutes to 1 hour. It is necessary that the sintering temperature and the sintering time are controlled so as to possibly reduce the reaction between silicon nitride and plate particles.

When cracks appear in ceramics, if particles dispersed in the ceramics are spherical, the particles are poor in preventing the propagation of these cracks and accordingly cannot substantially improve the toughness of the ceramics. In contrast, plate particles are superior in preventing the propagation of the cracks and accordingly can substantially improve the toughness. That is, when cracks appear in a silicon nitride sintered body, the propagation of the cracks is prevented by plate particles present in the sintered body or the direction of the propagation of the cracks is turned by the plate particles, whereby the sintered body has an improved toughness. A mixed powder comprising silicon nitride and the plate particles is subjected, prior to sintering, to pressure molding. At this time, the pressure applied allows the plate particles to be arranged with their principal planes nearly parallel to a plane to which a pressure is applied, whereby the sintered body obtained has a resistance to bending especially perpendicular to the plane.

The present invention will be explained in more detail below with reference to some examples. However, the present invention is in no way restricted to these examples.

EXAMPLE 1

According to the present invention, plate particles can easily be produced and can easily and uniformly be dispersed in a ceramic. Firstly, a metal silicide or metal carbide, which can be mechanically ground to powders, was melted and made into a lump. In this Example, the melting was conducted according to a non-consumable arc melting method; however, it was confirmed that similar results can be obtained according to other methods such as a high-frequency heating method. Then, each lump was subjected to grinding by the use of a hard alloy-made crucible and a hammer. That is, the crucible was fixed and the hammer was allowed to do a vertical reciprocating movement to grind the lump. The silicide or carbide underwent a cleavage and was converted for the most part to plate particles of which the ratio of the shorter diameter of principal plane of plate to the thickness of plate was 5 or above. The plate particles were sieved to obtain particles having a desired diameter. (Particles having a longer diameter of 100 μm or above were again ground and sieved.) FIG. 1 shows an example of the form of particles obtained by grinding and sieving. These particles have a flat-plate shape of which the shorter diameter of principal plane is about 20 μm and the thickness is 2 μm.

According to our study on mixing of plate particles with $Si_3N_4$, long-time mixing by a mortar and a pestle or a ball mill allowed the form of the plate particles to be altered to a spherical form and long-time mixing by a V-shaped mixer gave a superior result. However, in short-time mixing by mortar and a pestle or a ball mill, the degree of change of particle form was low and the effect of plate particles was retained. In this Example, $Si_3N_4$, a sintering aid and plate particles were mixed in a V-shaped mixer for 24 hours.

Incidentally, the metal silicide used above was prepared by weighing required amounts of a metal and silicon separately, mixing them, melting the mixture and subjecting the melt to natural cooling. The metal carbide used above was prepared by molding a commercially available metal crbide powder into discs each of 5 mm in thickness and 20 mm in diameter, subjecting these discs to preliminary sintering and then to melting, and subjecting the melt to natural cooling.

EXAMPLE 2

Figure 2:
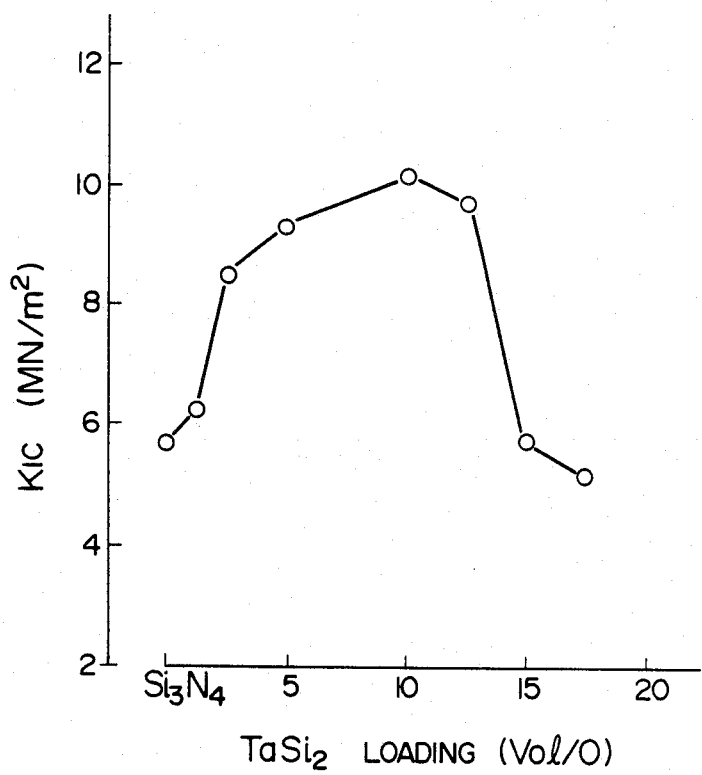
FIG. 2 is a graph showing a relation between the amount of plate particles added and the fracture toughness of the present sintered body, obtained in Example 2.
Figure 3:
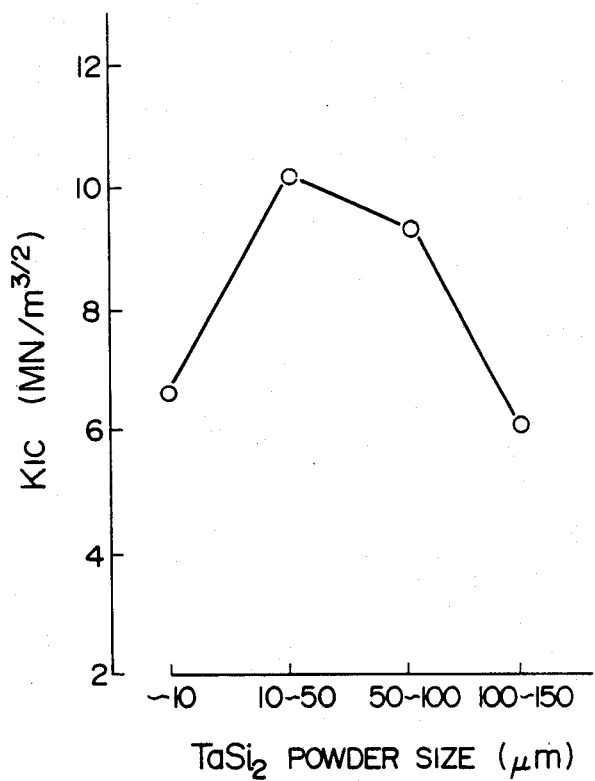
FIG. 3 is a graph showing a relation between the diameter of plate particles added and the fracture toughness of the present sintered body, obtained in Example 2.
Figure 4:
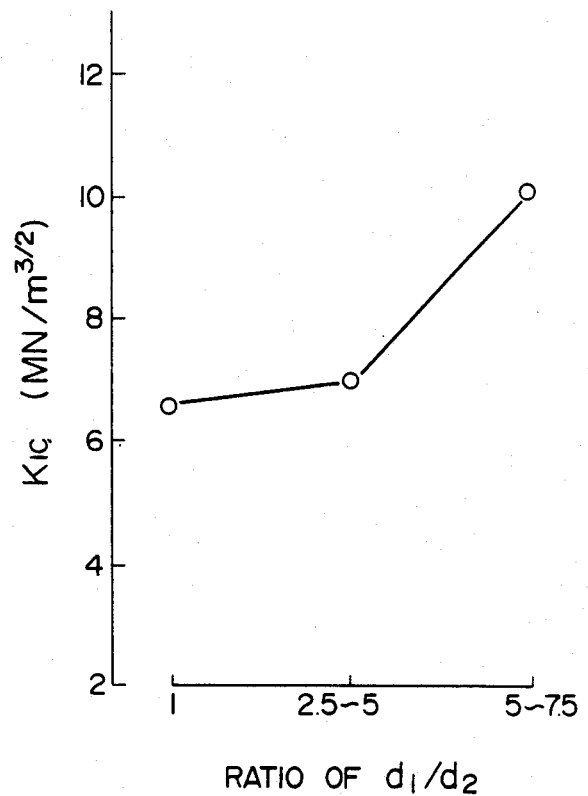
FIG. 4 is a graph showing a relation between the ratio of the shorter diameter $d_2$ of principal plane of plate particles to the thickness of the particles and the fracture toughness of the present sintered body, obtained in Example 2.

Metallic Ta and Si were weighed separately so as to correspond to a composition of $TaSi_2$ and were melted together in accordance with a non-consumable arc melting method. The resulting melt was subjected to mechanical grinding as described in Example 1 to prepare plate particles having different longer diameters of four classes, namely, 10 μm or below, 10 to 50 μm, 50 to 100 μm and 100 to 150 μm. Observation through an electron microscope revealed that most particles of each class had a ratio of the shorter diameter of principal plane of plate to the thickness of plate, of 5 or above. It was also confirmed by X-rays diffraction that all the particles were $TaSi_2$. The plate particles of each class were mixed with a commercially available $Si_3N_4$ having an average particle diameter of 0.5 to 3 μm and sintering aids in a V-shaped mixer. To each resulting mixture was added 5% of a polyvinyl alcohol and they were molded. Then, each molding was heated for 1 hour at 1,800° C. in a $N_2$ gas atmosphere by the use of a hot press to obtain a $Si_3N_4$-$TaSi_2$ complex sintered body. In this sintered body, 2.5% by volume of $Al_2O_3$ and 4.0% by volume of $Y_2O_3$ were added as sintering aids. For comparison, $Si_3N_4$ only with the sintering aids or a mixture of $Si_3N_4$, the sintering aids and a commercially available particulate $TaSi_2$ having an average particle size of 10 to 50 μm (ratio of the shorter diameter of principal plane of plate to the thickness of plate was 1 to 4) was also sintered in the same manner. On each of the sintered bodies obtained, fracture toughness ($K_{1c}$) was measured. This measurement was conducted by forming a notch of 0.1 mm on each sintered body by the use of a diamond cutter to prepare a test piece for a SENB (single edge notched beam) method. The results are shown in FIG. 2 and FIG. 3. The sintered bodies according to the present invention exhibit excellent fracture toughness. FIG. 2 shows a relation between the amount of $TaSi_2$ plate particles of 10 to 50 μm in diameter and $K_{1c}$. As is clear from FIG. 2, addition of 1.5% by volume or below of $TaSi_2$ to $Si_3N_4$ does not much contribute to toughness improvement, and addition of 15% by volume reduces the toughness of the resulting sintered body. From this it is seen that the amount of $TaSi_2$ plate particles added to $Si_3N_4$ is suitably 2 to 13% by volume and, in this range, $K_{1c}$ is 8.4 MN/cm² or above which is at least 1.4 times the $K_{1c}$ of $Si_3N_4$ only. FIG. 3 shows a relation between diameter of $TaSi_2$ plate particles added in 10% by volume and $K_{1c}$. As is clear from FIG. 3, the diameter of $TaSi_2$ plate particles added to $Si_3N_4$ is suitably 10 to 100 μm. If the diameter is smaller than 10 μm, the addition effect of plate particles is almost nil as in the case of addition of spherical particles, and if the diameter is larger than 100 μm, the toughness of the resulting sintered body is reduced. FIG. 4 shows a relation between the ratio of the shorter diameter $d_2$ of principal plane of plate to the thickness of plate, of $TaSi_2$ plate particles of 10 to 50 μm in diameter added in 10% by volume and $K_{1c}$. In FIG. 4, a ratio of 1 implies spherical particles. As is seen from FIG. 4, if the ratio is 5 or above, improvement in toughness due to the addition of $TaSi_2$ plate particles was striking.

EXAMPLE 3

There were prepared various sintered bodies wherein particles prepared by the same melting and grinding as in Example 1 were dispersed in $Si_3N_4$. $K_{1c}$ was measured on each sintered body. The results are shown in Table 1. All the sintered bodies according to the present invention showed excellent fracture toughnesses as compared with a sintered body of $Si_3N_4$ only. It is seen from Table 1 that the addition of a silicide or carbide of V, Nb or Ta or the addition of a carbide of Mo or W is particularly effective.

Incidentally, the particles used for dispersion in $Si_3N_4$ contained a large amount of plate particles and their ratio of the shorter diameter of principal plane of plate to the thickness of plate was in a range of 5 to 9.

TABLE 1

| Additive | Addition amount (vol/o) | Particle diameter (μm) | $K_{1c}$ (MN/m$^{3/2}$) |
|---|---|---|---|
| $TiSi_2$ | 10 | 10–50 | 8.3 |
| $ZrSi_2$ | " | " | 7.9 |
| $HfSi_2$ | " | " | 8.5 |
| $VSi_2$ | " | " | 9.8 |
| $NbSi_2$ | " | " | 9.5 |
| $CrSi_2$ | " | " | 8.2 |
| $MoSi_2$ | " | " | 8.7 |
| $WSi_2$ | " | " | 8.5 |
| $TaSi_2, VSi_2$ | 10 (5:5) | " | 9.8 |
| $CrSi_2, VSi_2$ | 10 (5:5) | " | 9.0 |
| TiC | 10 | " | 8.5 |
| ZrC | " | " | 8.2 |
| HfC | " | " | 8.5 |
| VC | " | " | 9.7 |
| NbC | " | " | 9.5 |
| TaC | " | " | 9.5 |
| $Cr_3C_7$ | " | " | 8.2 |
| $Mo_2C$ | " | " | 9.8 |
| WC | " | " | 9.7 |
| TiC, WC | 10 (5:5) | " | 9.3 |
| VC, WC | 10 (5:5) | " | 9.9 |

Matrix: $Si_3N_4$
Control: $Si_3N_4$ ($K_{1c}$ 5.7 MN/m$^{3/2}$)

We claim:

1. A high toughness silicon nitride sintered body, characterized in that said sintered body comprises silicon nitride as a main component and at least one member selected from the group consisting of silicides and carbides in the form of plate particles, of Ti, Zr, Hf, V, Nb, Ta, Cr, Mo and W, the thickness of plate of said plate particles being 1/5 or below of the shorter diameter of principal plane of plate of the plate particles.

2. A high toughness silicon nitride sintered body according to claim 1, wherein the longer diameter of principal plane of plate of the plate particles is larger than the diameters of other particles also present in the sintered body but smaller than 100 μm, and the plate particles occupy 2 to 13% of the volume of the sintered body.

3. A high toughness silicon nitride sintered body according to claim 1, wherein the ratio ($d_1/d_2$) of the longer diameter $d_1$ of principal plane of plate of the plate particles to the shorter diameter $d_2$ of the same plane is 10 or below.

4. A process for producing a high toughness silicon nitride sintered body, which comprises the steps of:
   subjecting at least one silicide or carbide of Ti, Zr, Hf, V, Nb, Ta, Cr, Mo and W to melting, cooling and mechanical grinding to obtain a powder consisting of plate particles,
   subjecting the powder to sieving to select those plate particles of which the thickness of plate is 1/5 or below of the shorter diameter of principal plane of plate,
   mixing the selected plate particles with a sintering aid and a silicon nitride powder and then subjecting the resulting mixture to pressure molding to obtain a molding, and
   sintering the molding at such a temperature that the plate particles in the molding are substantially not melted, reacted and changed in their properties.

* * * * *